United States Patent [19]

Foster et al.

[11] Patent Number: 5,019,718

[45] Date of Patent: May 28, 1991

[54] FREQUENCY INSENSITIVE DIGITAL PHASE ANGLE MEASURING CIRCUIT

[75] Inventors: Joseph Foster; Abdul Rashid, both of Rockford, Ill.

[73] Assignee: Sundstrand Corporation, Rockford, Ill.

[21] Appl. No.: 438,793

[22] Filed: Nov. 20, 1989

[51] Int. Cl.[5] .................................................. H02J 3/00
[52] U.S. Cl. ......................................... 307/84; 322/32
[58] Field of Search ............................. 322/32; 307/84

[56] References Cited

U.S. PATENT DOCUMENTS 3,378,756  4/1968  Potter ..................................... 322/32
3,601,708  8/1971  Stempler ............................... 328/155
4,684,873  8/1987  Glennon ................................. 307/84
4,714,869  12/1987  Onitsuka ............................... 307/84

Primary Examiner—A. D. Pellinen
Assistant Examiner—Jeffrey A. Gaffin
Attorney, Agent, or Firm—Wood, Phillips, Mason, Recktenwald & Vansanten

[57] ABSTRACT

The problem of stabilizing operation of a load division control (74) is resolved using a phase angle counter circuit (90) which calculates phase angle insensitive to frequency changes of the output voltage waveform. The phase angle counter circuit (90) includes a series of counters (94, 96, 100 and 102) for calculating phase angle.

13 Claims, 5 Drawing Sheets

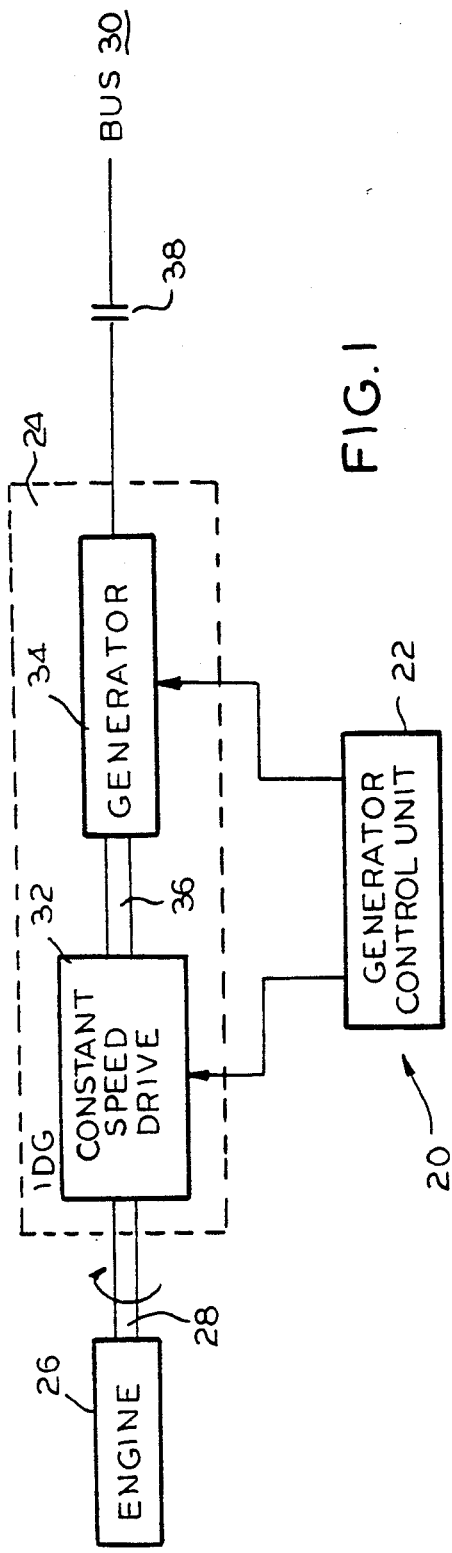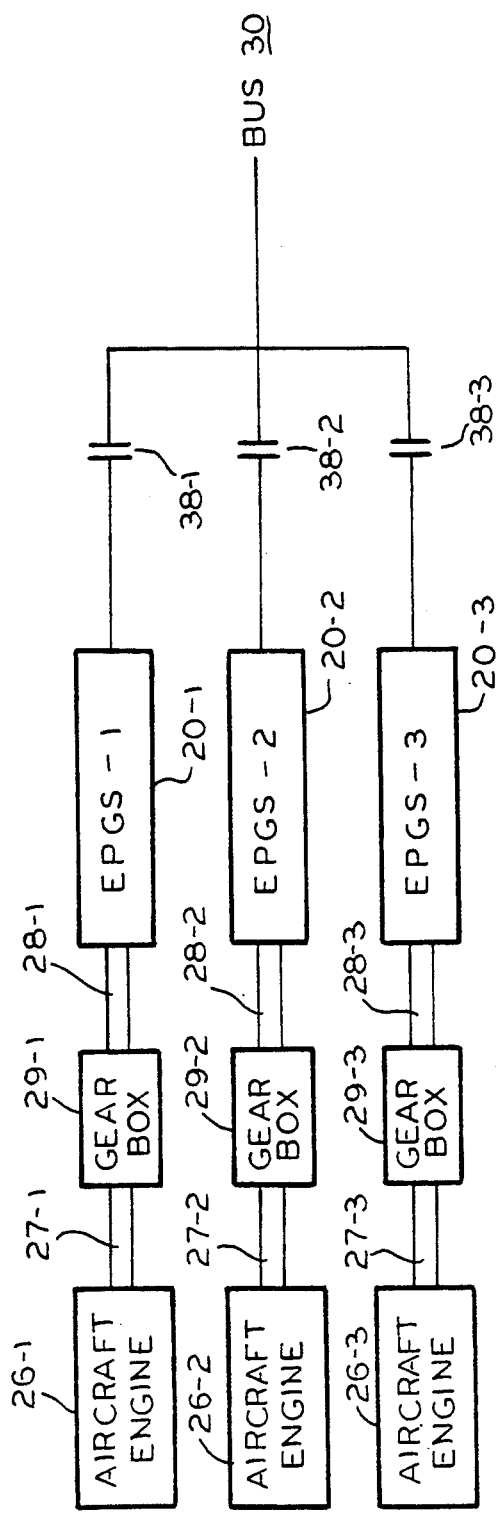

FREQUENCY INSENSITIVE DIGITAL PHASE ANGLE MEASURING CIRCUIT

FIELD OF THE INVENTION

This invention relates to electrical power generating systems and, more particularly, to an improved phase angle measuring circuit therefor.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine and delivers electrical power at constant frequency The constant speed drive includes a speed control assembly and receives mechanical input power at varying speed from the aircraft engine and delivers power from its output shaft at constant speed The generator comprises a salient pole machine with a rotating field which is excited through an exciter powered by a permanent magnet generator (PMG) through a voltage regulator. Such conventional systems use a generator control unit (GCU) to provide voltage regulation and speed regulation Specifically, a voltage regulator provides excitation power to an exciter at levels which provide constant system voltage at the point of regulation. A speed control controls trimming of a servo valve to maintain generator speed, and thus frequency, to be constant.

Prior generator control units used either analog or digital circuits, with the choice being based on factors such as weight, size, cost and complexity of control logic. In analog systems both integrated circuits and discrete components are used and some signals are converted to digital form. However, signals are combined and perform their required functions using analog type control. Such system products incorporate standard, off-the-shelf components Implementing a system which has the complexity of a generator control unit with standard product technology requires the use of many hundreds of electronic devices even for a relatively simple application, such as for a single channel EPGS. Each device adds additional weight to the product, including indirect weight in the form of additional circuit board area and housing needed to support the inclusion of each device. Since commercial and military aircraft are the intended end use of such products, it is desirable to minimize weight.

Further, analog circuits tend to be environmentally sensitive. For example, parameter drift results owing to changes in temperature and humidity, as well as age of the devices. Further, with analog technology the control cannot be easily changed. Instead, circuit components must be modified resulting in custom design for each different application.

In digital control systems, conversely, all signals are converted to digital form and the control and protection functions are controlled by a microprocessor. As such, the control system is inherently more flexible in implementing different control schemes. In a digital control system the control unit contains a microprocessor and associated software and continuously and sequentially checks for proper system conditions and for control commands, and performs the automatic or command and control functions. However, the actual flexibility available with such a digital system is limited due to limitations in processing time available in the microprocessor for performing both control and protection functions In fact, known GCU systems employ an analog control for implementing the voltage regulator functions. As a result, it is necessary to provide circuit components associated with voltage regulation.

Additional problems result in the design of generator control units In each application it is necessary to develop a cost effective, lightweight solution. Therefore, the designer must start from "scratch" in designing a generator control unit for each new application. This results in each generator control unit being custom made and therefore more expensive.

A typical multi-channel electrical power generating system includes two or more generators operating in parallel. Advantageously, the loading is shared equally by each generator. Specifically, field excitation has a direct effect on the reactive load supplied by each machine and some effect on the relative division of real load among the generators. A generator which is underexcited carries less than its share of lagging reactive system load. The transfer of its reactive load to other machines will increase their heating. An underexcited machine also has less than normal synchronizing torque and is therefore more likely to pull out of synchronism on a heavy load transient.

Prior known generating systems have used load division control including current transformer loops to sense the direction and magnitude of deviation of each generator load from the average load. The output of any one current transformer is the difference between the current in that generator and the average current of the paralleled generators. The magnitude of the current indicates how much the output of the generator has deviated from its required share of the load, and the phase angle indicates whether the generator is carrying more or less than its share of the load. Such load division controls have employed real load division by sensing the DC output of a real load demodulator to bias the signal to the integrated drive generator speed control in order to maintain real load division. A reactive load division demodulator operates similarly, except that the phase voltage is shifted by 90° and is summed with the voltage regulator error to trim the generator excitation current to ensure equal reactive load division.

However, such a control scheme does not compensate for effect on the relative division of real load caused by changes in field excitation of one machine.

Such load division circuits are responsive to the phase angle between point of regulation voltage and current. A generating system is normally operated to provide, for example, 400 Hz power. However, the frequency can vary, typically between 380 and 420 Hz. For stable operation it is desirable that the phase angle measuring circuit be insensitive to frequency changes.

Further problems can be encountered in implementing the phase angle measuring circuit in a digital control. Specifically, the phase angle is determined by dividing time differences between the current and voltage waveforms at a preselected point, and dividing the same by the period of the waveform. However, performing such a division can be problematic in certain digital control circuits.

The present invention is directed to overcoming one or more of the problems discussed above.

SUMMARY OF THE INVENTION

In accordance with the invention, a phase angle measuring circuit is insensitive to frequency changes.

Broadly, there is disclosed herein a frequency insensitive phase angle measuring circuit in a load division control for a generator control unit in a multi-channel generating system. Each channel has a main generator and an exciter providing field current to the main generator, for controlling excitation to divide loading equally between each channel responsive to a phase angle between output voltage and a difference from average current for each channel. The measuring circuit comprises a system clock generating a clocking signal at a select frequency A period counter is responsive to the system clocking output voltage for determining period of an output voltage waveform. A phase clock is responsive to the period counter and generates a clocking signal having a select number of clocking pulses each period of the output voltage waveform. A phase angle counter is responsive to the phase clock, the voltage output waveform and a difference from average current waveform for calculating the phase angle insensitive to frequency changes of the waveforms.

It is a feature of the invention that the measuring circuit further comprises a dividing counter interposed between the system clock and the period counter to develop a lower frequency clocking signal used by the period counter for determining the period.

It is another feature of the invention that the dividing counter comprises an up counter.

It is a further feature of the invention that the period counter comprises an up counter.

It is an additional feature of the invention that the measuring circuit further comprises a latch circuit interposed between the period counter and the phase clock for storing an output of the period counter.

It is yet another feature of the invention that the phase clock comprises a down counter.

It is yet an additional feature of the invention that the phase angle counter comprises an up counter.

It is still a further feature of the invention that the measuring circuit further comprises a logic circuit.

In one form, the logic circuit is coupled to the period counter for developing a logic signal representing period of the output voltage waveform.

In another form, the logic circuit is coupled to the latching circuit for resetting the stored period counter output at a select time related to the output voltage waveform.

In yet another form of the invention the logic circuit is coupled to the phase counter for developing a logic signal representing a select time related to the output voltage waveform and the difference from average current waveform.

In yet another form the logic circuit represents phase difference between the output voltage waveform and the difference from average current waveform.

It is still a further feature of the invention that the measuring circuit further comprises a latch circuit responsive to the phase angle counter for storing a count representing the phase angle.

In one form, the logic circuit is coupled to the latch circuit for resetting the stored phase angle count at a select time related to the difference from average current waveform.

Specifically, a generator control unit includes a speed control and a voltage regulator for operating an integrated drive generator. Both the speed control and voltage regulator implement a load division loop to provide equal sharing of loading between plural generators in a multi-channel electrical power generating system. The load division loops operate to vary point of regulation (POR) voltage and frequency for each generator so that the difference from average current for each generator remains close to zero. Specifically, the control compares the phase difference between the POR voltage and the difference from average current. The difference from average current is determined using a current transformer loop composed of a series string of current transformer secondaries and burden resistors.

The disclosed circuit uses a series of counter circuits to determine the phase difference between the POR voltage and the difference from average current insensitive to frequency changes.

A divide by 256 up counter divides a system clock by 256 to obtain a low frequency clock. A POR period counter, clocked at the low frequency clock, measures the time difference between successive rising edges of the POR waveform to determine the period. The output of this counter is latched until the succeeding rising edge. A down counter is responsive to the latched output for developing a signal having a frequency independent of the system clock and the POR waveform. Specifically, the down counter generates 256 pulses each period of the POR waveform. Finally, a phase angle counter, clocked by the down counter, has its output connected to another latch and is enabled between zero crossing points of the POR waveform and the difference from average current waveform to determine the phase difference insensitive to frequency changes.

Further features and advantages of the invention will readily be apparent from the specification and from the drawings.

BRIEF DESCRIPTION OF THE DRAWINGS

FIG. 1 is a simplified block diagram for an aircraft electrical power generator system (EPGS) including a voltage regulator implementing a load division control according to the invention;

FIG. 2 is a simplified block diagram for the EPGS of FIG. 1 used in a multi-channel power generating system;

DETAILED DESCRIPTION OF THE INVENTION

Figure 3:
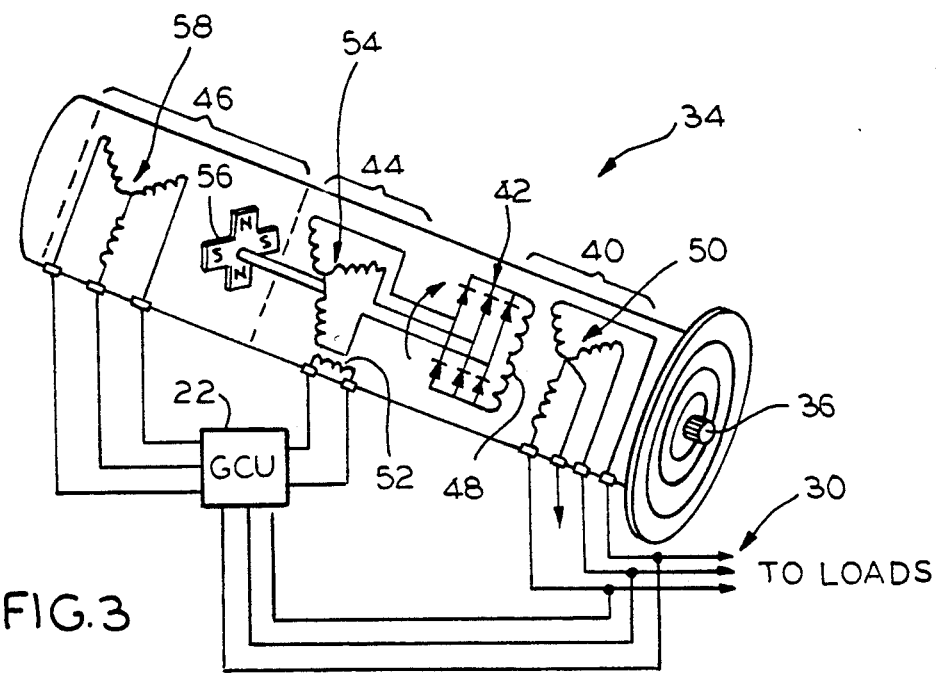
FIG. 3 is a combined schematic and perspective view of an EPGS generator.

With reference to FIG. 1, a block diagram representation illustrates an electrical power generating system (EPGS) 20 including a generator control unit (GCU) 22 according to the invention. In the illustrated embodiment, the EPGS 20 is used in an aircraft providing power to aircraft loads. The GCU 22 could be used in connection with various other generating systems, as is obvious to those skilled in the art.

In addition to the GCU 22, the EPGS 20 includes an integrated drive generator (IDG) 24. The IDG 24 receives mechanical power at varying speed from an aircraft engine 26 through a rotating shaft 28 and delivers electric power at constant frequency at a power bus 30.

With reference also to FIG. 2, the EPGS 20 is illustrated in connection with a multi-channel power generating system including three parallel EPGS's 20-1, 20-2 and 20-3, each of which is identical in construction. Specifically, each of the three EPGS's 20-1, 20-2 and 20-3 are connected through associated input shafts 28-1, 28-2 and 28-3, respectively, and gear boxes 29-1, 29-2 and 29-3 to engine output shafts 27-1, 27-2 and 27-3 connected to the aircraft engines 26-1, 26-2 and 26-3. Each EPGS 20 develops output power to supply the bus 30 through associated contactors 38-1, 38-2 and 38-3. In accordance with the invention, it is desired that the load sharing to the bus 30 be distributed equally among the three EPGS's 20-1, 20-2 and 20-3, as discussed below.

Since each of the EPGS's 20-1, 20-2 and 20-3 is identical in construction, only one is described specifically herein and is referred to without the suffix comprising the generator number.

The IDG 24 includes a constant speed drive 32 and a generator 34. The constant speed drive 32 receives mechanical input power from the shaft 28 at varying speed and delivers mechanical power from its output shaft 36 at constant speed. The generator 34 is driven by the shaft 36 and develops electrical output power through suitable fault protection circuits represented by a generator relay or contactor, illustrated schematically at 38, to the bus 30.

With reference also to FIG. 3, the generator 34 includes a main generator 40, a rotating rectifier bridge assembly 42, an exciter 44 and a permanent magnet generator (PMG) 46. Each of the main generator 40, exciter 44 and PMG 46 includes a rotor driven by the constant speed drive 32 via the common shaft 36. As is well known, the generator 34 may be mounted in a common housing with the constant speed drive 32 and, more specifically, may be mounted in line or side-by-side, as is necessary or desired.

The main generator 40 is a salient pole machine having a rotating field producing output power at a frequency of 400 Hz. Particularly, a four pole machine is used at 12,000 rpm, while a two pole machine is used at 24,000 rpm. The main generator 40 includes a rotor carrying a DC field winding 48, and a stator carrying a polyphase AC armature winding 50.

The exciter 44 is a multi-pole salient pole machine which provides excitation to the main generator 40. The exciter 44 includes a stator carrying a DC field winding 52 and a rotor carrying a polyphase AC armature winding 54. The armature winding 54 is connected through the rotating rectifier bridge assembly 42 to the main armature DC field winding 48.

The PMG 46 is a pilot generator in which field flux is provided by a permanent magnet 56 mounted on a rotor driven by the shaft 3 and which is magnetically coupled with a polyphase stator armature winding 58.

The PMG stator winding 58 is connected through the GCU 22 to the exciter DC field winding 52. Although not specifically illustrated herein, the GCU 22 includes a rectifier which converts the polyphase AC power from the PMG stator winding 58 to DC power which is regulated to drive the exciter DC field winding 52.

As is conventional in brushless power generators, rotation of the shaft 36 by the aircraft engine 26 through the constant speed drive 32 and a gearbox, not shown, results in generation of a polyphase voltage in the exciter armature windings 54 as they traverse the magnetic field set up by the exciter DC field winding 52. This polyphase voltage is rectified by the rotating rectifier bridge assembly 42, and the rectified power is coupled to the main generator field winding 48. The current in the main generator field winding 48 and the rotation of the shaft 36 sets up a rotating magnetic field in space occupied by the main generator stator windings 50. The stator windings 50 develop polyphase output power at constant frequency which is delivered to the AC bus 30 for powering loads.

Figure 4:
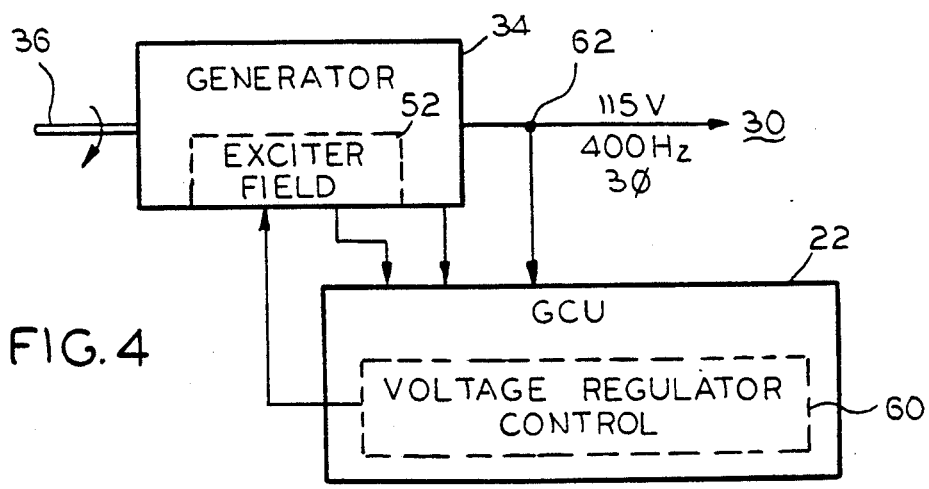
FIG. 4 is a simplified block diagram of a voltage regulator control loop.

With reference also to FIG. 4, a block diagram illustrates a control loop for regulating excitation to the exciter DC field winding 52. Specifically, a voltage regulator control 60 in the GCU 22 controls generator output voltage at a point of regulation (POR) using sensors 62 for sensing system conditions, such as voltage and current. The GCU 22 regulates the energy coupled from the exciter field winding 52 to the exciter armature winding 54 and ultimately to the main generator 40.

Figure 5:
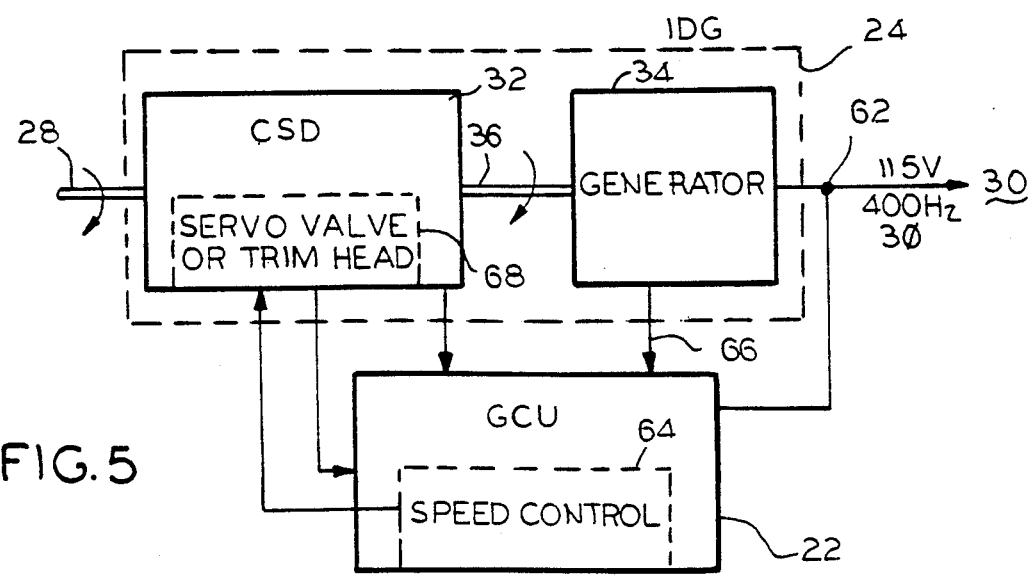
FIG. 5 is a simplified block diagram of a speed control loop.

With reference to FIG. 5, a block diagram illustrates a speed control loop for controlling output speed of the constant speed drive 32. The GCU 22 includes a speed control 64 which receives a frequency signal on a line 66 from the generator 34. As is well known, the frequency of the power on the line 66 is representative of speed of the shaft 36. The speed control 64 alters the position of a servo valve or trim head 68 in the constant speed drive 32 in order to maintain a constant output speed on the shaft 36.

Figure 6:
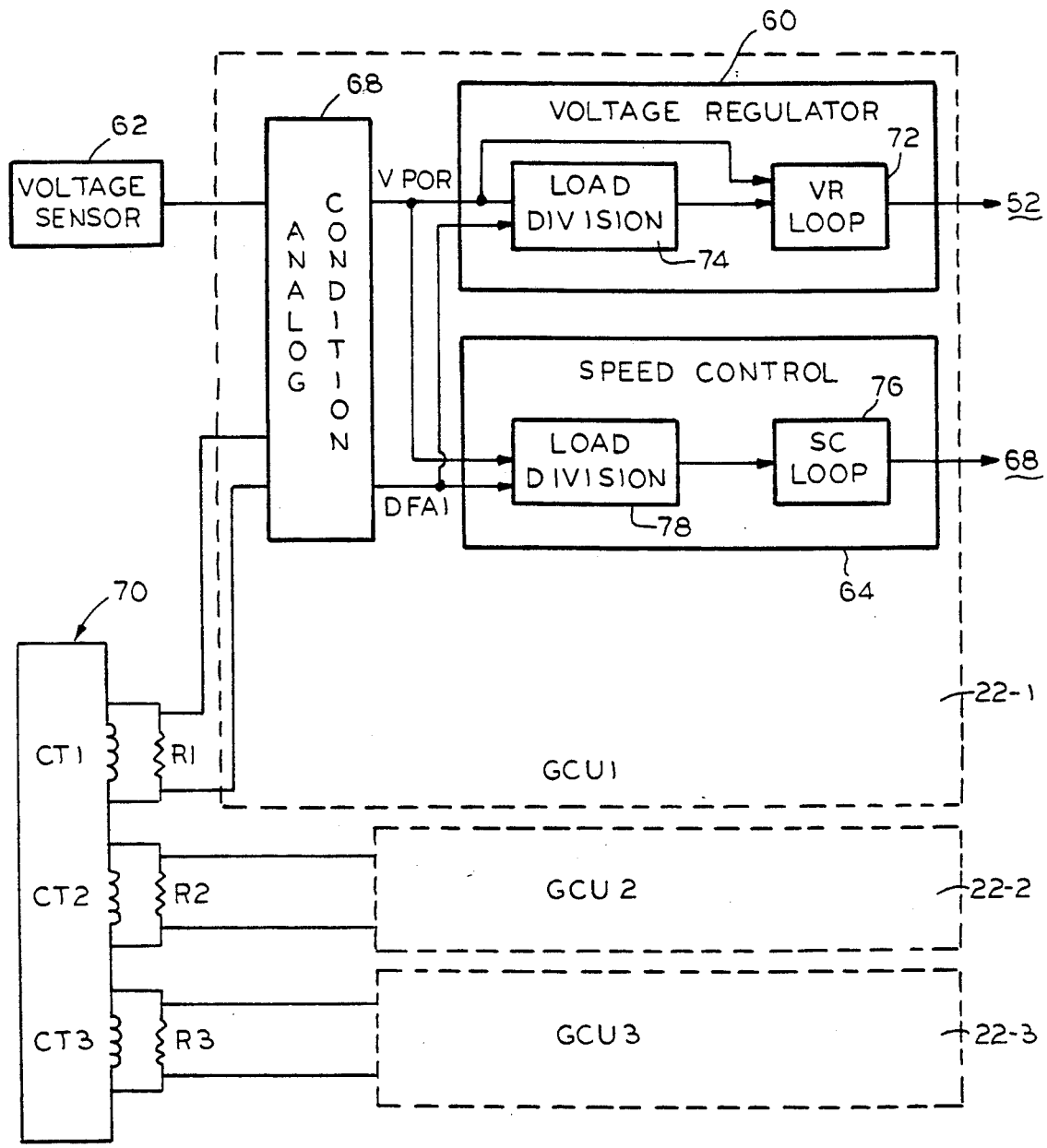
FIG. 6 is a combined schematic and functional block diagram of the control loops implemented in the generator control unit of FIG. 1.

With reference to FIG. 6, a combined schematic and functional block diagram illustrates a representation of the GCU 22-1 according to the invention. The GCU's 22-2 and 22-3 for the remaining generators in the multi-channel system are identical in construction and therefore are not described in detail herein. For simplicity, the suffix relating to the generator number is omitted.

The generator's three phase voltage signals are sensed at the point of regulation by the sensors 62, see FIG. 4, and are conditioned by an analog condition circuit 68 and are applied to both the voltage regulator 60 and the speed control 64. The analog condition circuit 68 also receives a signal from a load division current transformer loop 70 representing deviation of generator load from the average load. This CT loop 70 comprises a series string of current transformer secondary CT1-CT3 and associated respective burden resistors R1-R3. Each current transformer CT1-CT3 is on the same phase of its respective associated generator. The analog condition circuit 68 receives a signal representing voltage across the burden resistor R1 which represents the difference from average current for the first electrical power generating system 20-1.

As is well known, the output of any one of the current transformers CT1-CT3 is the difference between the current in that generator and the average current of the parallel generators. The magnitude of the current indicates how much the output of the generator has deviated from its required share of the load, and the phase angle indicates whether the generator is carrying more or less than its share of the load. Since the output of the current transformers represents total current, the real and reactive components must be derived.

The voltage regulator 60 includes a voltage regulation control loop 72 and compares point of regulation voltage to a reference to develop an error which is compensated to pulse width modulate an exciter field drive switching circuit (not shown) to vary the field current to the exciter field winding 52, see FIG. 4. A load division module 74 is operative for multi-channel parallel systems. This module 74 receives signals from the analog condition circuit 68 representing phase information for the POR waveform and phase and amplitude information for the difference from average current. The output of the load division module 74 is applied to the voltage regulator loop 74 to bias the voltage error to trim the generator excitation current to ensure equal real and reactive load division.

The speed control 64 includes a speed control loop 76 which responds to actual speed and desired speed for developing a PWM signal having a duty cycle which varies the position of the servo valve or trim head 68, see FIG. 5, to control speed. The speed control 64 also includes a load division module 78 which is operative for multi-channel parallel systems. This module 78 receives signals from the analog condition circuit 68 representing phase information for the POR voltage waveform and phase and amplitude information for the difference from average current waveform. The output of the load division module 78 biases the speed error in the speed control loop 76 in order to maintain real load division.

Figure 7:
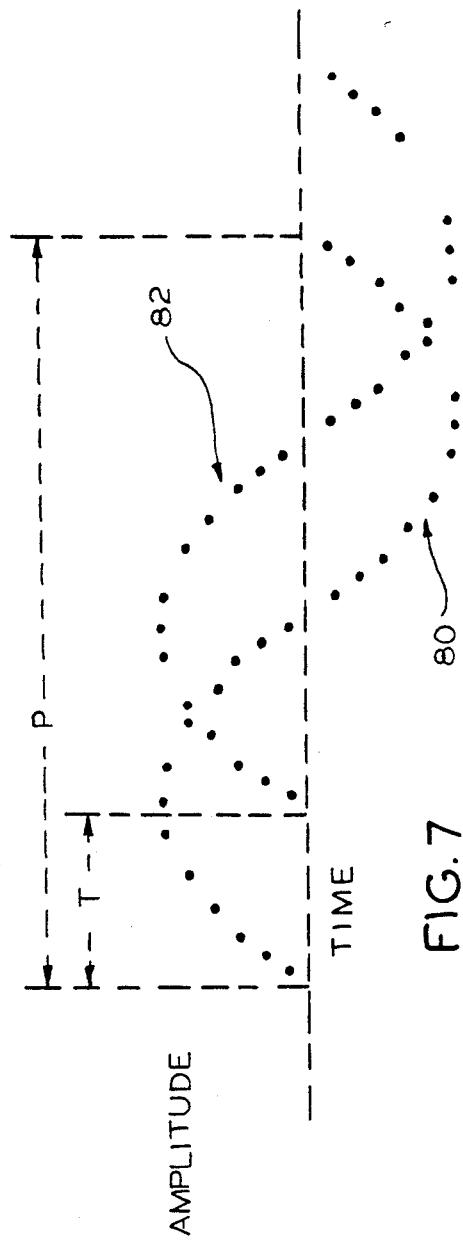
FIG. 7 is a series of waveforms illustrating the phase angle to be measured.

With reference to FIG. 7, a series of waveforms illustrate the phase angle to be measured by the load division modules 74 and 78, see FIG. 6.

The POR voltage is represented by a sinusoidal waveform 80 having a period P. The difference from average current signal is represented by a waveform 82, which is also sinusoidal, and is offset in time from the waveform 80 by a phase difference T which represents a phase angle $\theta$. The phase angle $\phi$ is determined by dividing the time difference T between zero crosses of the waveforms 80 and 82 by the period P and multiplying this quotient by $2*\pi$, as is well known.

The function of the load division modules 74 and 78 is to divide loading equally between the three generators by making the reactive and real components of the difference from average current approach zero. The real and reactive components are obtained by the following equations:

VREACTIVE=K*DFAI*SIN($\phi$)   (Equation 1)

VREAL=K*DFAI*COS($\phi$)   (Equation 2)

where:

K is a programmable gain constant = turns ratio of the current transformer CT1 times the resistance of the burden resistor R1;

DFAI is the magnitude of the difference from average current; and $\phi$ is the angle between POR voltage and DFAI.

Figure 8:
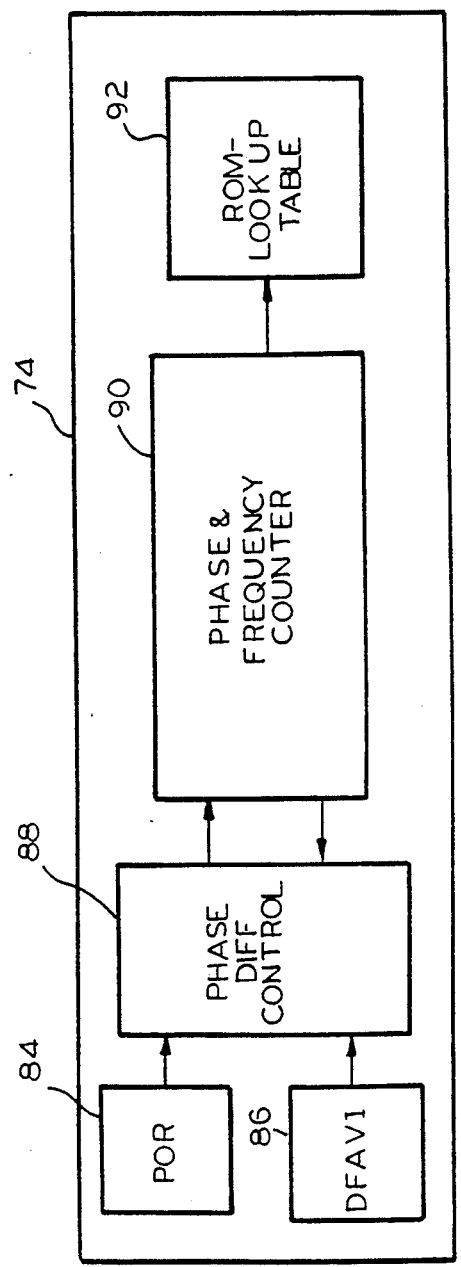
FIG. 8 is a functional block diagram of a load division control of the speed control and voltage regulator of FIG. 6.

With reference to FIG. 8, a functional block diagram represents a circuit for the voltage regulator load division module 74. Although not specifically illustrated, the speed control load division module 78 may be identical in construction and is therefore not disclosed in detail herein.

The load division module 74 is a peripheral circuit in the voltage regulator 60 which is free running and generates a completion flag to the voltage regulator to update information. In the illustrated embodiment, the voltage regulator circuit 60 uses custom very large scale integration (VLSI) technology to reduce size, weight, life cycle costs and improve reliability.

The load division module 74 receives the POR voltage waveform signal at a block 84 and a difference from average current waveform at a block 86. A phase difference control 88, comprising a programmable logic array, operates in connection with a phase and frequency counter circuit 90 to determine the phase difference between the two waveforms. Specifically, the counter circuit 90 develops an address used by a ROM lookup table 92 to determine the sine and cosine of the phase angle to determine real and reactive components of the power for use in the voltage regulator loop 72 and speed control loop 76, as discussed above.

Figure 9:
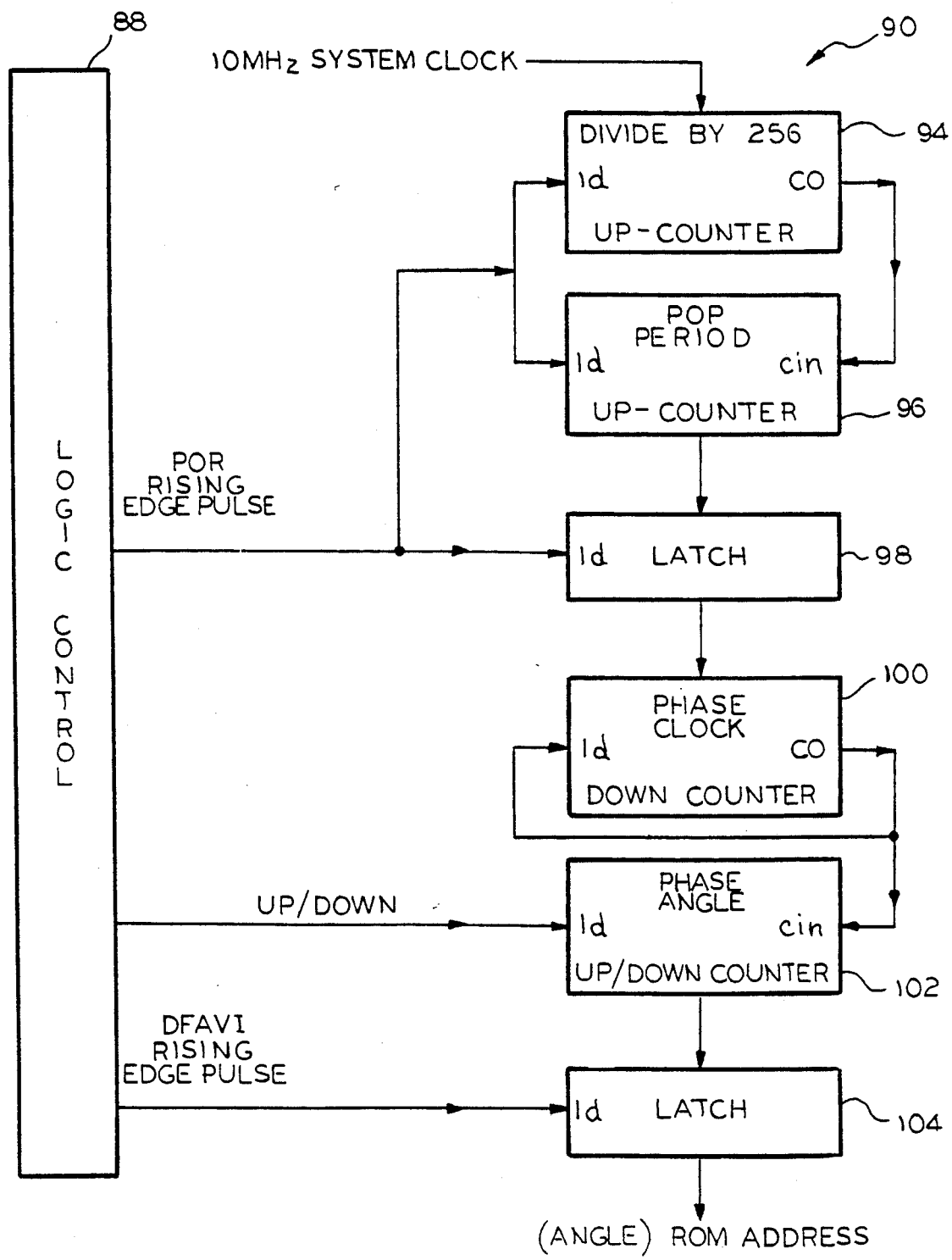
FIG. 9 is a hardware block diagram of a phase and frequency counter circuit of the load division circuit of FIG. 8.

With reference to FIG. 9, a hardware block diagram illustrates a preferred embodiment for the phase and frequency counter circuit 90. The circuit 90 uses a series of counters of conventional design.

A divide by 256 counter, comprising a first up counter, 94 receives the 10 MHz system clock and has a carry output connected to the clock input of a POR period counter 96. The divide by 256 counter 94 allows all successive counters to have an eight-bit less word width. The equation representing the carry output of the divide by 256 counter 94 can be derived by the following equation:

$$CO = \frac{SYSCLK}{256} \quad \text{(Equation 3)}$$

The POR period counter 96 receives an enable signal from the control 88 representing the period of the POR waveform. The POR period counter output is updated every rising edge of the POR waveform. The equation for the output of the POR period counter 96 is as follows:

$$COUNTOUT = \frac{P * SYSCLK}{256} \quad \text{(Equation 4)}$$

The output of the POR period counter 96 is applied to a latch circuit 98 which stores the POR period and is reset by a logic signal from the control 88 comprising a pulse at the rising edge of the POR waveform.

The output of the latch 98 is connected to a phase clock counter 100 which comprises a down counter. The phase clock counter 100 is configured to provide a phase measurement clock signal independent of the system clock and the POR waveform frequency Specifically, the phase clock 100 generates a clocking signal which guarantees 256 pulses each cycle of the POR waveform. The output of the phase clock counter 100 is represented by the following equation:

$$FREQUENCY = 256 * (POR\ FREQUENCY) = \frac{256}{P} \quad \text{(Equation 5)}$$

The output of the phase clock counter 100 is applied to a phase angle counter 102 which counts pulses from the phase clock counter 100 subsequent to the resetting of the latch circuit 98. A logic signal from the control 88 enables the phase angle counter 102 during the time T between zero crosses, see FIG. 7. The output of the phase angle counter 102 is stored in a latch circuit 104 which receives a difference from average rising edge pulse from the control circuit 88. The latch circuit 104 is effective to store the calculated or measured phase angle between the POR and difference from average current in accordance with the following equation:

$$\text{COUNT} = (\text{TIME ENABLED}) * \frac{256}{P} \quad \text{(Equation 6)}$$

The output of the latch 104 defines an address, representing the phase angle, to the ROM lookup table 92, see FIG. 8.

Thus, in accordance with the above, the counter circuit 90 calculates a measurement of the phase angle which is insensitive to frequency changes of the point of regulation output.

I claim:

1. In a load division control for a generator control unit in a multi-channel generating system, each channel having a main generator and an exciter providing field current to the main generator, for controlling excitation to divide loading equally between each channel responsive to a phase angle between output voltage and difference from average current for each channel, a frequency insensitive phase angle measuring circuit comprising:
   a system clock generating a clocking signal at a select frequency;
   a period counter responsive to said system clock and output voltage for determining period of an output voltage waveform;
   a phase clock responsive to said period counter generating a clocking signal having a select number of clocking pulses each period of the output voltage waveform; and
   a phase angle counter responsive to said phase clock the output voltage waveform and a difference from average current waveform for calculating said phase angle insensitive to frequence changes of said waveforms.

2. The frequency insensitive phase angle measuring circuit of claim 1 further comprising a dividing counter interposed between said system clock and said period counter to develop a lower frequency clocking signal used by said period counter for determining said period.

3. The frequency insensitive phase angle measuring circuit of claim 2 wherein said dividing counter comprises an up counter.

4. The frequency insensitive phase angle measuring circuit of claim 1 wherein said period counter comprises an up counter.

5. The frequency insensitive phase angle measuring circuit of claim 1 further comprising a latch circuit interposed between said period counter and said phase clock for storing an output of the period counter.

6. The frequency insensitive phase angle measuring circuit of claim 5 further comprising a logic circuit coupled to said latching circuit for resetting the stored period counter output at a select time related to the output voltage waveform.

7. The frequency insensitive phase angle measuring circuit of claim 1 wherein said phase clock comprises a down counter.

8. The frequency insensitive phase angle measuring circuit of claim 1 wherein said phase angle counter comprises an up counter.

9. The frequency insensitive phase angle measuring circuit of claim 1 further comprising a logic circuit coupled to said period counter for developing a logic signal representing period of the output voltage waveform.

10. The frequency insensitive phase angle measuring circuit of claim 1 further comprising a logic circuit coupled to said phase angle counter for developing a logic signal representing a select time related to the output voltage waveform and the difference from average current waveform.

11. The frequency insensitive phase angle measuring circuit of claim 10 wherein said logic signal represents phase difference between the output voltage waveform and the difference from average current waveform.

12. The frequency insensitive phase angle measuring circuit of claim 1 further comprising a latch circuit responsive to said phase angle counter for storing a count representing said phase angle.

13. The frequency insensitive phase angle measuring circuit of claim 12 further comprising a logic circuit coupled to said latch circuit for resetting the stored phase angle count at a select time related to the difference from average current waveform.

* * * * *